US012246759B2

United States Patent
Simoni et al.

(10) Patent No.: US 12,246,759 B2
(45) Date of Patent: Mar. 11, 2025

(54) METHOD FOR CONTROLLING THE OCCUPANCY OF VEHICLE SEATS BY PASSENGERS, AND ASSOCIATED DEVICES

(71) Applicant: ALSTOM Holdings, Saint-Ouen-sur-Seine (FR)

(72) Inventors: Bastian Simoni, Nogent sur Marne (FR); Luc Jung, Bron (FR)

(73) Assignee: ALSTOM Holdings, Saint-Ouen-sur-Seine (FR)

( * ) Notice: Subject to any disclaimer, the term of this patent is extended or adjusted under 35 U.S.C. 154(b) by 139 days.

(21) Appl. No.: 17/302,817

(22) Filed: May 12, 2021

(65) Prior Publication Data
US 2021/0354732 A1 Nov. 18, 2021

(30) Foreign Application Priority Data
May 18, 2020 (FR) .................................. 20 04944

(51) Int. Cl.
| | |
|---|---|
| *B61D 41/04* | (2006.01) |
| *B60Q 3/233* | (2017.01) |
| *G06Q 10/02* | (2012.01) |
| *G08B 5/00* | (2006.01) |
| *H04B 10/116* | (2013.01) |

(52) U.S. Cl.
CPC ............. *B61D 41/04* (2013.01); *B60Q 3/233* (2017.02); *G08B 5/00* (2013.01); *H04B 10/116* (2013.01); *G06Q 10/02* (2013.01)

(58) Field of Classification Search
CPC .......... B61D 41/04; B60Q 3/233; G08B 5/00; H04B 10/116; G06Q 10/02
See application file for complete search history.

(56) References Cited

U.S. PATENT DOCUMENTS

| | | | |
|---|---|---|---|
| 2017/0200355 A1* | 7/2017 | Gruenbaum | ........... B61D 41/00 |
| 2017/0233098 A1 | 8/2017 | Gerard | |
| 2021/0266741 A1* | 8/2021 | Kwatra | ................. H04W 12/06 |

FOREIGN PATENT DOCUMENTS

| | | | | |
|---|---|---|---|---|
| CN | 107662708 A | * | 2/2018 | ............... B60Q 3/44 |
| DE | 102005048080 A1 | | 4/2007 | |
| DE | 112019004200 T5 | * | 6/2021 | ............. G06Q 10/00 |

(Continued)

OTHER PUBLICATIONS

French Search Report issued for French Patent Application No. FR 2004944, dated Feb. 10, 2021 in 2 pages.

*Primary Examiner* — Curtis A Kuntz
*Assistant Examiner* — James E Munion
(74) *Attorney, Agent, or Firm* — Knobbe, Martens, Olson & Bear, LLP

(57) ABSTRACT

A method is for controlling the occupancy of the seats of one or more vehicle(s) by passengers using a control device for controlling the occupancy of the seats. The vehicle includes a number of seats equipped with a reading light. The control device includes each reading light, a control system for controlling the reading lights and a controller. The method includes an emission of at least one piece of data related to the seat toward an electronic device of a passenger of the vehicle. The piece of data is emitted using a wireless optical communication technique, which is a technique of visible light communication. The emission of the at least one piece of data related to the seat is carried out by the reading light of the seat controlled by the control system.

14 Claims, 2 Drawing Sheets

(56) References Cited

FOREIGN PATENT DOCUMENTS

| | | | |
|---|---|---|---|
| EP | 3476690 | A1 | 5/2019 |
| KR | 20180096327 | A | 8/2018 |
| WO | 2011/023481 | A1 | 3/2011 |

\* cited by examiner

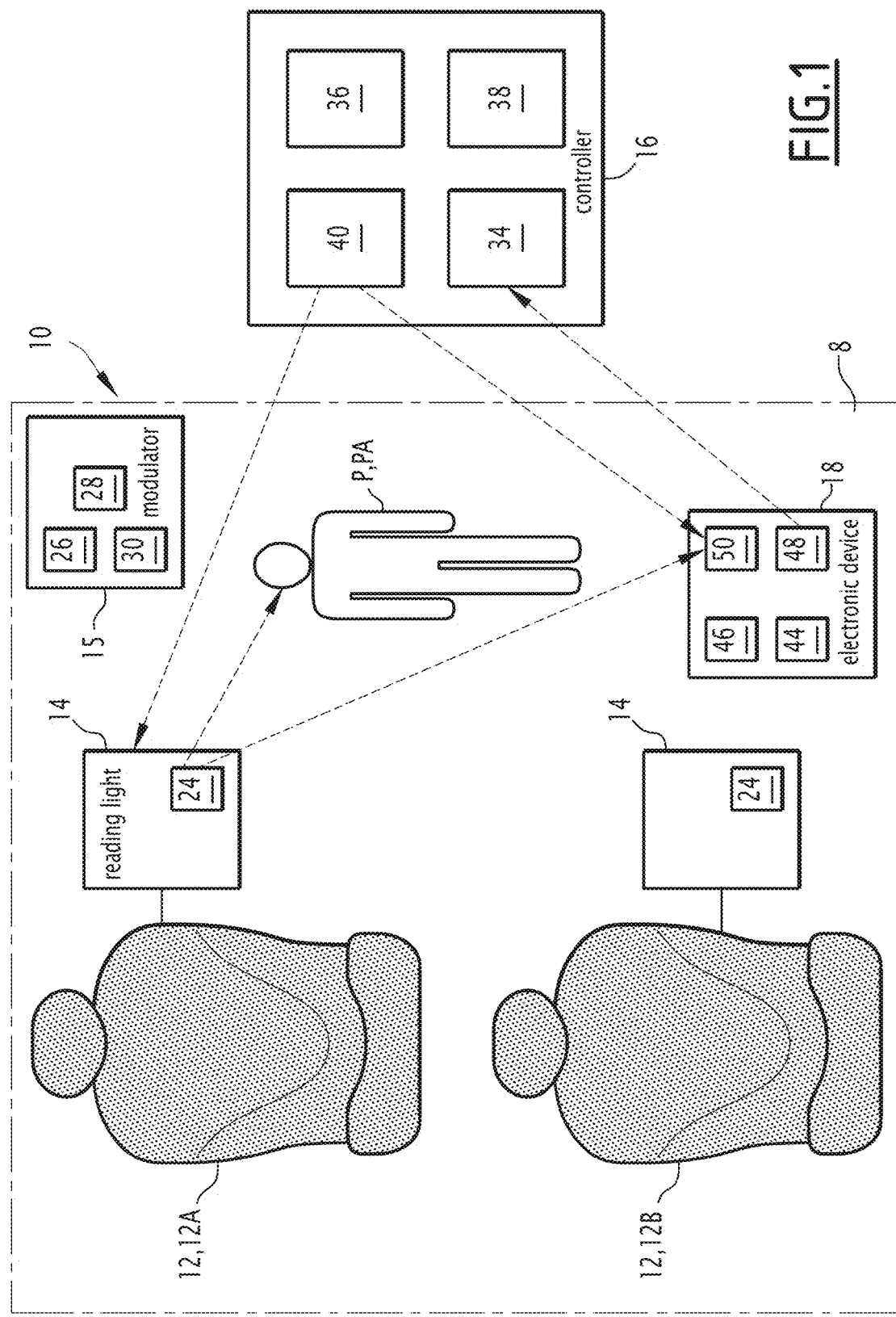

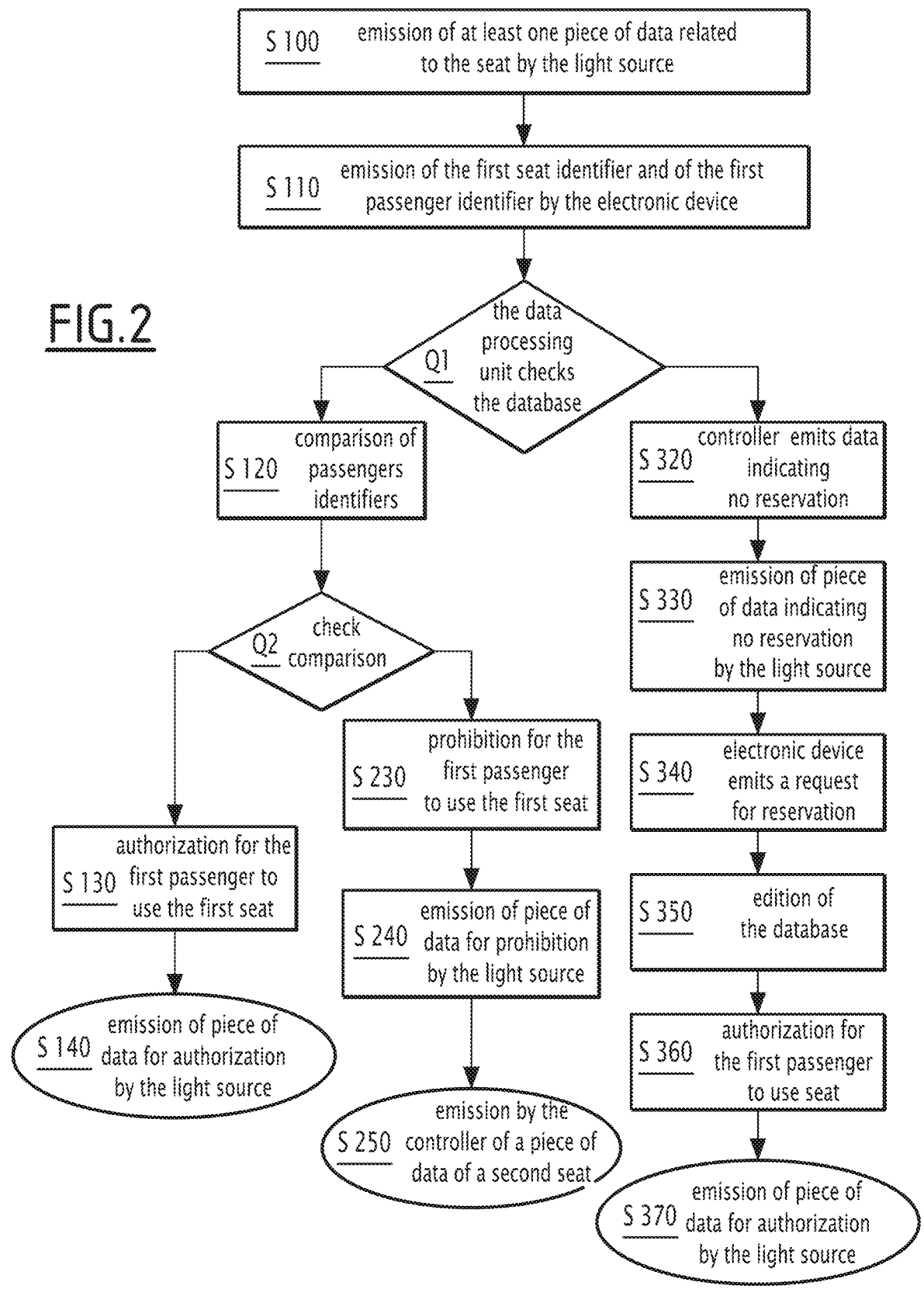

METHOD FOR CONTROLLING THE OCCUPANCY OF VEHICLE SEATS BY PASSENGERS, AND ASSOCIATED DEVICES

CROSS-REFERENCE

This patent application claims the benefit of French Patent Application FR 20 04944, filed on May 18, 2020 which is hereby incorporated by reference.

FIELD OF THE INVENTION

The present invention relates to a method for controlling the occupancy of the seats of a vehicle by passengers. The present invention further relates to associated reading light system and control device.

BACKGROUND OF THE INVENTION

It is known that controlling the occupancy of the seats of a vehicle, particularly a railway vehicle, is performed by an agent dedicated to that task. Such a control method therefore entails the physical presence of an agent within the vehicle.

It is also known that such a control may be performed using sensors such as sensors built into the seats or detection cameras installed in the passenger compartment that can recognize passengers by video analysis.

However, such a method requires both installing special sensors in the passenger compartment of the vehicle, and those sensors must have as little impact as possible on the comfort of the passengers or the aesthetics of the compartment. Additionally, video analysis-based systems require that the video camera system have good visual coverage of all the seats.

Such methods are difficult to implement and/or require human intervention.

SUMMARY OF THE INVENTION

There is therefore a need for a method to control the occupancy of the seats of a vehicle that is simpler and that requires fewer human and/or material resources.

To do so, the present invention relates to a method for controlling the occupancy of the seats of one or more vehicle(s) by passengers using a control device for controlling the occupancy of the seats, the vehicle comprising a plurality of seats equipped with a reading light, the control device comprising each reading light, a control system for controlling the reading lights, and a controller, the method comprising:

a step of emitting at least one piece of data related to a seat toward an electronic device of a passenger of the vehicle, the piece of data being emitted using a wireless optical communication technique, the technique being the technique of visible light communication, the emitting step being carried out by the reading light of the seat controlled by the control system.

According to particular embodiments, the method comprises one or more of the following features taken in isolation or in any combination that is technically possible:

when the seat is reserved, the method comprises a step of emitting a piece of data related to the status of the seat for the passenger, carried out by the control device, said piece of data being either a piece of data authorizing the use of the seat by the passenger when the passenger is the passenger having reserved the seat, or a piece of data prohibiting the use of the seat by the passenger when the passenger is different from the passenger having reserved the seat, the step of emitting a piece of data related to the status of the seat for the passenger is carried out by displaying a light signal to the passenger, the method further comprises, when the seat is not reserved, a step of emitting a piece of data related to the status of the seat, indicating that the seat is not reserved, the piece of data related to the seat comprises an identifier of the seat, the method further comprising:

a step of receiving an identifier of the passenger emitted by the electronic device of the passenger for the controller; and a step of generating the piece of data related to the status of the seat for the passenger, carried out by the controller, the generating step comprising a step of comparison between the identifier of the passenger having reserved the seat and the identifier of the passenger, the method further comprises, when the seat is not reserved, a step of receiving a seat reservation request from the passenger, carried out by the controller, and a step of associating the identifier of the seat with the identifier of the passenger, carried out by the controller, when the passenger is different from the passenger having reserved the seat, the method further comprises a step of emitting, toward the electronic device of the passenger, at least one piece of location data of another, unreserved seat, said step being carried out by the controller.

the electronic device is an intelligent mobile terminal, such as a smartphone, and the controller is a remote server.

The present invention further relates to a reading light system of the type comprising a reading light of a vehicle seat and a control system, the control system being capable of controlling the reading light to emit data related to the seat toward an electronic device of a passenger of the vehicle, the data being emitted using a wireless optical communication technique, the technique being the technique of visible light communication.

The present invention further relates to a control device for controlling the occupancy of the seats of a vehicle by passengers, the vehicle comprising a plurality of seats equipped with a reading light, the control device comprising each reading light, a control system for controlling the reading lights, and a controller, the control system being capable of controlling each reading light of a seat to emit data related to the seat toward an electronic device of a passenger of the vehicle, the data being emitted using a wireless optical communication technique, the technique being the technique of visible light communication.

BRIEF DESCRIPTION OF THE DRAWINGS

The invention will be better understood upon reading the following description, given only as an example, referring to the attached drawings, in which:

FIG. 1 is a schematic depiction of a passenger and of a part of a vehicle comprising two seats and a communication device, and FIG. 2 is a flowchart of an example implementation of a method for controlling the occupancy of the seats of FIG. 1 by the passenger.

DETAILED DESCRIPTION OF THE PREFERRED EMBODIMENTS

FIG. 1 depicts a part of the vehicle 8 and a passenger P. The passenger P is equipped with an electronic device 18.

The vehicle 8 is, for instance, a railway vehicle such as a train or tram.

The vehicle 8 comprises a plurality of seats 12 and a control device 10 for controlling the occupancy of the seats 12.

The control device 10 comprises a reading light system and a controller 16. The reading light system comprises a reading light 14 associated with each seat 12 and a control system 15 for controlling the reading lights 14. Advantageously, the reading light control system is centralized, and able to control each reading light.

In one variant, the control device comprises a respective control system 15 for each reading light 14.

In FIG. 1, for simplicity's sake, only two seats 12 are depicted, with the understanding that any number of seats may be considered for the vehicle 8.

In this example, each seat 12 may be reserved by a single passenger.

A seat 12 is therefore reserved when there is a unique association between a passenger and said seat 12.

At least a plurality of seats 12 of the vehicle 8 are equipped with a reading light 14 of the control device 10.

In particular, the seats 12 depicted in FIG. 1 are each equipped with a reading light 14. The seats 12 depicted in FIG. 1 are, for instance, grouped within the vehicle 8.

In the example in FIG. 1, a first seat 12A is distinguished from a second seat 12B, the first and second seats 12A and 12B being in all respects identical.

In the example described, each reading light 14 is identical, so only one is described in the following.

The reading light 14 comprises a light source 24.

In the proposed example, the light source 24 comprises at least one light-emitting diode.

The reading light control system 15 comprises a memory 26, a receiver 28, and a control unit 30. The control system 15 is able to control the light source 24 to emit data using a wireless optical communication technique.

In the described example, the communication technique is the visible light communication technique.

As its name indicates, the visible light communication technique transmits data in the form of light signals whose wavelength is in the visible spectrum, meaning that it is between 400 nanometres (nm) and 800 nm.

Such a communication technique is also known by the acronym VLC, which stands for "Visible Light Communication".

Thus, in the remainder of the document, the visible light communication technique is simply named as the VLC technique.

The light source 24 is therefore able to emit light signals in the visible spectrum.

In particular, the control system 15 is able to modulate the light signal, e.g. in its amplitude and/or frequency and/or phase.

More generally, the light source 24 is able to emit a specific light signal corresponding to at least one piece of data related to the associated seat 12 which is to be transmitted.

In the example described, the control system 15 is able to control the light source 24 to emit the piece of data related to the seat 12 toward the electronic device 18 using the VLC technique.

The piece of data related to the seat 12 comprises, for instance, an identifier of the seat 12.

Advantageously, the electronic device 18 is able to receive and interpret that data in order to provide statuses associated with the seat 12.

In one example, the data related to the seat comprises a piece of data related to a status of the seat 12 for the passenger P.

The piece of data related to the status of the seat 12 is, for instance, a piece of data authorizing the use of the seat 12 by the passenger P or a piece of data prohibiting the use of the seat 12 by the passenger P, or even more advantageously a piece of data indicating that the seat 12 is not reserved.

Advantageously, the control system 15 is able to control the light source 24 so that it emits a light having a specific colour based on the emitted piece of data related to the seat 12, in particular the piece of data related to the status of the seat 12 for the passenger P.

Thus, when the piece of data related to the status of the seat is a piece of data indicating that the seat 12 is not reserved, the light source 24 is able to emit a light that the passenger P is able to discern, the light being of a first colour.

When the piece of data related to the seat 12 is a piece of data authorizing the use of the seat 12 by the passenger P, the light source 24 is able to emit a light of a second colour different from the first colour. The emitted light is such that the passenger P is able to discern it and distinguish it from the first colour.

When the piece of data related to the seat 12 is a piece of data prohibiting the use of the seat 12 by the passenger P, the light source 24 is able to emit a light of a third colour different from the first colour and second colour. The emitted light is such that the passenger P is able to discern it and distinguish it from the first colour and second colour.

The three aforementioned colours (first, second, and third colours) are distinct. To give one particular example, the first colour is yellow, the second colour is green, and the third colour is red.

Thus, the piece of data related to the seat 12 emitted by the light source 24 is able to comprise an identifier of the seat 12 and/or the status of the seat 12 for the passenger P.

The memory 26 is able to save data for each seat 12/reading light 14 set with which the control system 15 is associated, and in particular the piece of data related to the seat 12 to which the reading light 14 belongs. In particular, the memory 26 saves an identifier of the seat 12 to which the reading light 14 belongs.

The receiver 28 is able to receive data.

The receiver 28 is, for instance, an antenna.

By way of illustration, the receiver 28 is an antenna able to receive a piece of data via radio-wave communication.

The control unit 30 is able to control the light source 24. Such a control is a frequency and/or power control.

The control device 10 is able to carry out a method of controlling the occupancy of the seats 12 by the passenger P.

In the proposed example, the device 10 for controlling the occupancy of the seats 12 comprises each reading light 14 of each seat 12, the reading light control system 15, and the controller 16.

The controller 16 comprises a receiver 34, a database 36, a data processing unit 38, and an emitter 40.

The controller 16 is, for instance, a remote server outside the vehicle 8 or a server integrated into the vehicle 8.

In the example in FIG. 1, the controller 16 is a remote server outside the vehicle 8.

The receiver 34 is able to receive the piece of data related to the seat 12 comprising for instance the identifier of the seat 12 as well as an identifier of the passenger P from the electronic device 18 of the passenger P via an electromagnetic or optical or wireless signal. The receiver 34 is, for instance, an antenna able to receive a piece of data via, for instance, a radio-wave communication.

The receiver 34 is, furthermore, able to receive a request to reserve the seat 12 made by the passenger P.

The database 36 associates a piece of data related to each seat 12 reserved by a passenger P with the identifier of the passenger P having reserved the seat 12. The database 36 associates, for instance, the identifier of each seat 12 reserved by a passenger P with the identifier of the passenger P having reserved the seat 12.

The data processing unit 38 is able to receive the piece of data related to the seat 12 as well as an identifier of the passenger P from the receiver 34. The data processing unit 38 is furthermore able to compare the identifier of the seat 12 with the identifiers of the seats 12 from the database 36 and the identifier of the passenger P with the identifiers of the passengers P from the database 36.

The data processing unit 38 is, furthermore, able to receive the request to reserve the seat 12 made by the passenger P from the receiver 34.

The data processing unit 38 is furthermore able to generate the piece of data related to the status of the seat 12 for the passenger P.

When the seat 12 is reserved and the identifier of the passenger P matches the identifier of the passenger P having reserved the seat 12, the piece of data related to the status of the seat 12 is a piece of data authorizing the use of the seat 12 by the passenger P.

When the seat 12 is reserved and the identifier of the passenger P is different from the identifier of the passenger P having reserved the seat 12, the piece of data related to the status of the seat 12 is a piece of data prohibiting the use of the seat 12 by the passenger P.

When the seat 12 is reserved and the identifier of the passenger P is different from the identifier of the passenger P having reserved the seat 12, the data processing unit 38 is furthermore adapted to generate at least one piece of data of the location of another, unreserved seat 12.

When the seat 12 is not reserved, the piece of data related to the status of the seat 12 is a piece of data indicating that the seat 12 is not reserved.

The data processing unit 38 is furthermore able, if the seat 12 is not reserved and the data processing unit 38 receives a request to reserve the seat 12 made by the passenger, to edit the database 36 to therein associate the identifier of the seat 12 with the identifier of the passenger P.

The emitter 40 is able to emit the piece of data related to the status of the seat 12 to the control system 15 via an electromagnetic signal.

The emitter 40 is, for instance, an antenna able to emit a piece of data via, for instance, a radio-wave communication. The emitter 40 is furthermore able to emit the piece of data of the location of another, unreserved seat 12 toward the electronic device of the passenger P. The electronic device 18 of the passenger P comprises a memory 44, a camera 46, an emitter 48, and a receiver 50.

The memory 44 of the electronic device 18 saves an identifier of the passenger P to whom the electronic device 18 belongs.

The camera 46 is able to receive the piece of data related to the seat 12. In particular, the camera 46 is able to receive the piece of data related to the seat 12 using the wireless optical communication technique, the wireless optical communication technique being the VLC technique.

Thus, the camera 46 is able to receive at least one light signal emitted by the light source 24 of the reading light 14.

The emitter 48 of the electronic device 18 is able to emit the piece of data related to the seat 12, particularly the identifier of the seat 12, and the identifier of the passenger P to whom the electronic device 18 belongs, toward the controller 16 via an electromagnetic signal. The emitter 48 is, for instance, an antenna adapted to emit a piece of data via, for instance, a radio-wave communication.

The emitter 48 of the electronic device 18 is, furthermore, able to emit the request to reserve the seat 12 made by the passenger P toward the controller 16.

The receiver 50 of the electronic device 18 is able to receive the piece of data of the location of another, unreserved seat from the controller 16 via an electromagnetic signal.

The receiver 50 is, for instance, an antenna adapted to receive a piece of data via, for instance, a radio-wave communication.

In one example, the electronic device 18 is an intelligent mobile terminal, such as a smartphone, and the controller 16 is a remote server.

The operation of the control device 10 is now described with reference to FIG. 2, which is a flowchart of an example implementation of a method for controlling the occupancy of the seats 12 of a vehicle by passengers P.

In the remainder of the document, a first passenger PA is distinguished from a second passenger PB. As previously mentioned, the first seat 12A is also distinguished from the second seat 12B, the second seat 12B not being reserved.

As the method comprises steps of tests, it will be presented in three example embodiments in order to describe all possible cases.

The first passenger PA wishes to use the first seat 12A.

In a first example implementation of the method, the first seat 12A is reserved by the first passenger PA.

During a first step S100, the light source 24 of the reading light 14 of the seat 12A emits at least one piece of data related to the seat 12A toward the electronic device 18 of the first passenger PA. The light source 24 emits, for instance, using a wireless optical communication technique, via a light signal, the identifier of the first seat 12A toward the camera 46 of the electronic device 18 of the passenger PA. The wireless optical communication technique is the visible light communication technique.

During a second step S110, the electronic device 18 emits the identifier of the first seat 12A and the identifier of the first passenger PA toward the controller 16. The controller 16 receives the identifier of the first seat 12A and the identifier of the first passenger PA emitted by the electronic device.

After the second step S110, a third step Q1 takes place, in which the data processing unit 38 of the controller 16 checks in the database 36 whether the first seat 12A is reserved. If the first seat 12A is reserved, which is the case in the first example, the following step is a fourth step S120.

If the first seat 12A is not reserved, the method proceeds according to the third example implementation of the method later on described, and the following step is a step S320.

In the first example implementation of the method, the following step is therefore the fourth step S120.

During the fourth step S120, the data processing unit 38 compares the identifier of the first passenger PA with the identifier of the passenger P having reserved the first seat 12A.

After the fourth step S120, a fifth step Q2 takes place, during which, if in the step 120 the identifier of the passenger PA is the identifier of the passenger having reserved the seat 12A, it is decided that the method will implement a sixth step S130, and if in the step 120 the identifier of the passenger PA is not the identifier of the passenger who reserved the seat 12A, the method proceeds according to the second example implementation of the method later on described, and it is decided that the method will implement a step S230.

The identifier of the passenger P is, in this first example implementation of the method, the identifier of the first passenger PA. During the step Q2, the data processing unit 38 then generates the piece of data related to the status of the seat for the passenger PA corresponding to authorization for the first passenger PA to use the first seat 12A. In the first example implementation of the method, the following step implemented by the method is therefore the sixth step S130.

During the sixth step S130, the controller 16 emits the piece of data related to the status of the seat 12A for the passenger PA, corresponding to the authorization for the first passenger PA to use the first seat 12A, toward the reading light control system 15 and/or toward the electronic device 18.

During a seventh step S140, the reading light control system 15 controls, for instance, the light source 24 of the reading light 14 to emit a piece of data related to the seat 12A, comprising the piece of data related to the status of the seat 12A indicating the authorization for the first passenger PA to use the first seat 12A, toward the first passenger PA. The light source 24 emits, for instance, a green-coloured light, visible to the first passenger PA.

The method according to the first example therefore comprises the implementation of seven steps S100, S110, Q1, S120, Q2, S130 and S140, which have just been described.

In the following, a second example implementation of the method is described, in which the first seat 12A is reserved by the second passenger PB.

According to this second example implementation of the method, the method further comprises the first step S100, the second step S110, the third step Q1, the fourth step S120, and the fifth step Q2.

During the fifth testing step Q2 in this second example implementation of the method, the identifier of the passenger P having reserved the first seat 12A being the identifier of the second passenger PB, the data processing unit 38 generates the piece of data related to the status of the seat 12A for the first passenger PA, corresponding to a prohibition to use the first seat 12A for the first passenger PA. The data processing unit 38 furthermore generates the piece of data of the location of another, unreserved seat 12, such as, for instance, the seat 12B. The following step that is implemented by the method is therefore an eighth step S230 different from the sixth step S130.

During the eighth step S230, the controller 16 emits the piece of data related to the status of the seat 12A for the first passenger PA, corresponding to a prohibition to use the first seat 12A for the first passenger PA, toward the reading light control system 15 and/or toward the electronic device 18.

During a ninth step S240, the reading light control system 15 controls, for instance, the light source 24 of the reading light 14 to emit a piece of data related to the seat 12A, comprising the piece of data related to the status of the seat 12A indicating the prohibition to use the first seat 12A for the first passenger PA, toward the first passenger PA. The light source 24 emits, for instance, a red-coloured light, visible to the first passenger PA.

During a tenth step S250, the controller 16 emits the piece of data of the location of the second seat 12B toward the electronic device 18 of the first passenger PA.

The method may then be repeated with the second seat 12B.

The method according to the second example therefore comprises the implementation of eight steps S100, S110, Q1, S120, Q2, S230, S240 and S250, which have just been described.

In the following, a third example implementation of the method is described, in which the first seat 12A is not reserved.

In this third example implementation of the method, the method also comprises the first step S100, the second step S110, and the third step Q1.

The data processing unit 38 generates the piece of data related to the status of the seat 12A, corresponding to a piece of data indicating that the first seat 12A is not reserved.

As the seat 12A is not reserved, after the third step Q1 is implemented, an eleventh step S320 is implemented instead of the fourth step S120.

During the eleventh step S320, the controller 16 emits the data indicating that the first seat 12A is not reserved toward the reading light control system 15 and/or the electronic device 18.

During a twelfth step S330, the reading light control system 15 controls, for instance, the light source 24 of the reading light 14 to emit a piece of data related to the seat 12A, comprising the piece of data related to the status of the seat 12A indicating that the first seat 12A is not reserved, toward the first passenger PA. The light source 24 emits, for instance, a yellow-coloured light, visible to the first passenger PA.

During a thirteenth step S340, the electronic device 18 emits a request to reserve the first seat 12A, made by the first passenger PA, toward the controller 16. The controller 16 receives the request to reserve the first seat 12A, made by the first passenger PA.

During a fourteenth step S350, the data processing unit 38 edits the database 36 to therein associate the identifier of the first seat 12A with the identifier of the first passenger PA, and generates a piece of data related to the status of the seat 12A indicating authorization for the first passenger PA to use the first seat 12A.

During a fifteenth step S360, the controller 16 emits the piece of data authorizing the first passenger PA to use the first seat 12A, toward the reading light control system 15 and/or to the electronic device 18.

During a sixteenth step S370, the reading light control system 15 controls, for instance, the light source 24 of the reading light 14 to emit a piece of data related to the seat 12A, comprising the piece of data related to the status of the seat 12A indicating the authorization for the first passenger PA to use the first seat 12A, toward the first passenger PA. The light source 24 emits, for instance, a green-coloured light, visible to the first passenger PA.

The method according to the third example therefore comprises the implementation of nine steps S100, S110, Q1, S320, S330, S340, S350, S360 and S370, which have just been described.

The method thereby makes it possible to control the occupancy of the seats 12A and 12B of the vehicle 8 by passengers P. Indeed, as illustrated with the three examples, the method is compatible with both reservable and non-reservable seating configurations. Furthermore, the method is uncomplicated to implement and requires little human and/or material resources. The proposed method enables any passenger P to verify and/or modify the reservation of a seat 12, particularly without having to request the assistance of an agent dedicated to performing that task.

Such a method also makes it possible to avoid the implementation, within the vehicle, of sensors that are expensive, complex, and would potentially involve the acquisition of the passenger's personal data, such as detecting occupancy and controlling said passenger by video camera analysis.

Rather, the implementation of the method simply requires changing the operation of the reading light 14 of the seat 12.

Such a method also enables genuine controlling of the actual occupancy of the seats 12, unlike a turnstile. In particular, it is common for a passenger P to get into the wrong vehicle when boarding while having the correct seat number. This is not possible with such a control device 10

The embodiments of the described method may be combined with other controlling methods whenever those embodiments are technically compatible with one another.

What is claimed is:

1. A method for controlling the occupancy of the seats of one or more vehicle(s) by passengers using a device controller for controlling the occupancy of the seats,
    the vehicle comprising a plurality of seats, each of the seats equipped with a reading light, the device controller comprising the reading lights, a modulator for controlling the reading lights, and a server,
    the method comprising:
    the reading light associated with one of the seats emitting a first piece of data related to a reservation status of the one of the seats toward an electronic device of a passenger of the vehicle, the piece of data being emitted using a wireless optical communication technique, the technique being the technique of visible light communication, the emission of the at least one piece of data related to the seat being carried out by the reading light of the seat controlled by the modulator;
    the server receiving an identifier of the passenger and an identifier of the one of the seats from the electronic device;
    the server generating a second piece of data related to the reservation status of the at least one seat for the passenger; and
    the reading light associated with the one of the seats emitting an indication of the reservation status of the one of the seats for the passenger toward the passenger based on the second piece of data.

2. The method according to claim 1, wherein, when the seat is reserved, the method comprises emitting a piece of data related to the reservation status of the seat for the passenger, carried out by the device controller, said piece of data being either a piece of data authorizing the use of the seat by the passenger when the passenger is the passenger having reserved the seat, or a piece of data prohibiting the use of the seat by the passenger when the passenger is different from the passenger having reserved the seat.

3. The method according to claim 1, further comprising, when the seat is not reserved, emitting a piece of data related to the reservation status of the seat, indicating that the seat is not reserved.

4. The method according to claim 2, further comprising:
    receiving the identifier of the passenger emitted by the electronic device of the passenger for the controller; and
    generating the second piece of data related to the reservation status of the seat for the passenger, carried out by the controller, the generation comprising a comparison between the identifier of the passenger having reserved the seat and the identifier of the passenger.

5. The method according to claim 4, further comprising, when the seat is not reserved, receiving a seat reservation request from the passenger, carried out by the controller, and an association of the identifier of the seat with the identifier of the passenger, carried out by the controller.

6. The method according to claim 1, wherein, when the passenger is different from the passenger having reserved the seat, the method further comprises emitting toward the electronic device of the passenger at least one piece of location data of another, unreserved seat, carried out by the controller.

7. The method according to claim 1, wherein the electronic device is an intelligent mobile terminal, and the controller is a remote server.

8. The method according to claim 7, wherein the electronic device is a smartphone.

9. A device controller for controlling an occupancy of a plurality of seats of a vehicle by passengers, the vehicle comprising the plurality of seats equipped with reading lights, wherein the device controller comprising:
    a modulator configured to control the reading lights and the device controller,
    wherein the modulator is configured to control one of the reading lights corresponding to one of the plurality of seats to emit data related to said one of the plurality of seats toward an electronic device of a passenger of the vehicle, wherein the data is related to an indication of a reservation status of the passenger,
    wherein the data is emitted using a wireless optical communication technique, the wireless optical communication technique being a technique of visible light communication.

10. The method according to claim 1, wherein, when the seat is reserved, the method comprises emitting a piece of data related to the reservation status of the seat for the passenger, carried out by the reading light, said piece of data being either a piece of data authorizing the use of the seat by the passenger when the passenger is the passenger having reserved the seat, or a piece of data prohibiting the use of the seat by the passenger when the passenger is different from the passenger having reserved the seat.

11. The method according to claim 1, wherein when the seat is not reserved, the method comprises emitting a piece of data related to the reservation status of the seat for the passenger, carried out by the reading light, said piece of data being a piece of data indicating that the seat is not reserved.

12. The method according to claim 1, further comprising:
    when the seat is not reserved, emitting by a light source of the reading light a light with a first color; and
    when the seat is reserved, emitting by the light source of the reading light
        a light with a second color when the passenger is the passenger having reserved the seat;
        a light with a third color when the passenger is different from the passenger having reserved the seat.

13. The method according to claim 1, wherein the light source of the reading light is configured to emit at least a first color, a second color, and a third color as the indication of the reservation status of the at least one seat,
    (i) when the one of the seats is reserved, the light source emits:
    the first color toward the electronic device of the passenger when the passenger is a person having a reservation for the one of the seats,
    the second color toward the electronic device of the passenger when the passenger is different from a person having the reservation for the one of the seats, (ii) when the seat is not reserved, the light source emits the third color toward the electronic device of the passenger, wherein the first color, the second color, and the third color are different colors with each other such that the passenger recognizes condition of the one of the seats without any operation in the electronic device.

14. The device controller according to claim 9, wherein the reading light associated with one of the seats emits a first piece of data related to a reservation status of the one of the seats toward the electronic device of the passenger of the vehicle, wherein the device controller is configured to receive an identifier of the passenger and an identifier of the one of the seats from the electronic device, the device controller is configured to generate a second piece of data related to the reservation status of the at least one seat for the passenger, and the reading light associated with the one of the seats is configured to emit an indication of the reservation status of the one of the seats for the passenger toward the passenger based on the second piece of data.

* * * * *